S. D. KING.
Vehicle-Spring.
No. 210,785.  Patented Dec. 10, 1878.
Fig. 1.
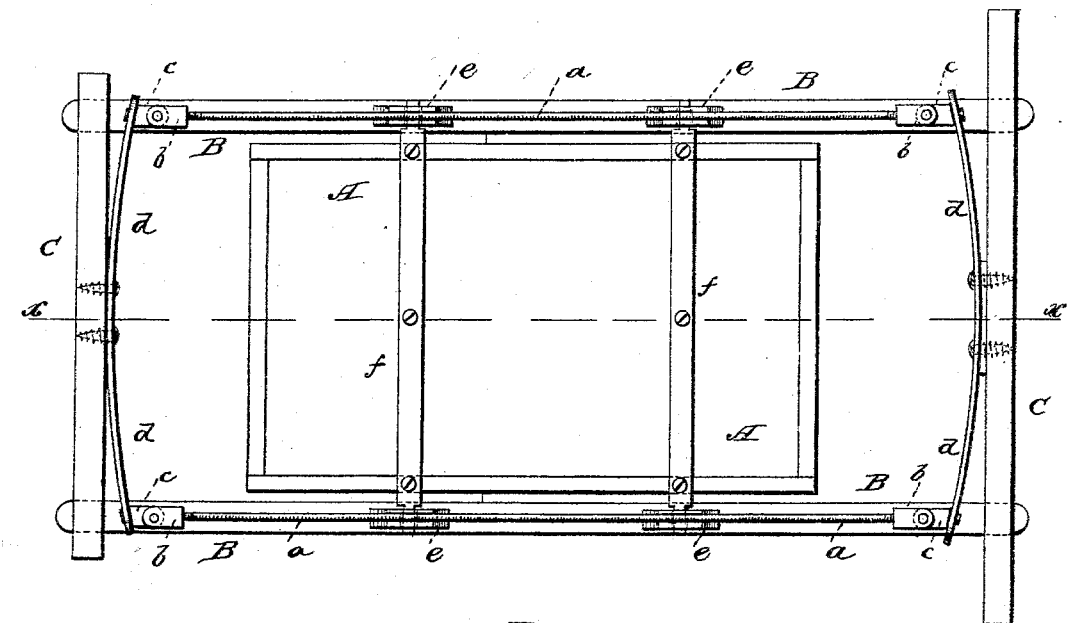
Fig. 2.
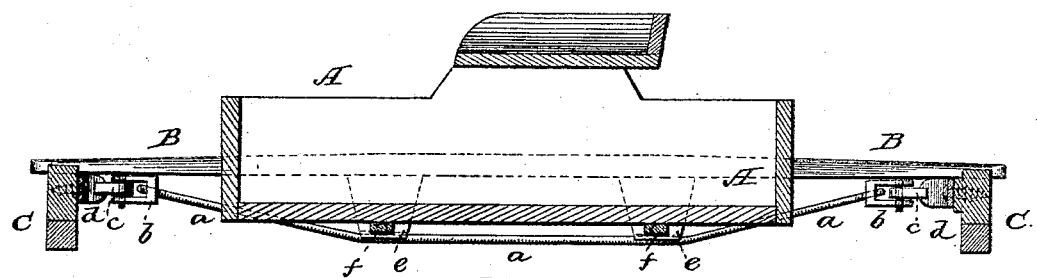
Fig. 3.
Witnesses:  Inventor:
Sidney D. King
Per C. H. Watson & Co, Attorneys.

UNITED STATES PATENT OFFICE.

SIDNEY D. KING, OF WEST PITTSTON, PENNSYLVANIA.

IMPROVEMENT IN VEHICLE-SPRINGS.

Specification forming part of Letters Patent No. 210,785, dated December 10, 1878; application filed September 17, 1878.

*To all whom it may concern:*

Be it known that I, SIDNEY D. KING, of West Pittston, in the county of Luzerne and State of Pennsylvania, have invented certain new and useful Improvements in Vehicle-Springs; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to vehicles, and has for its object to improve the same, where increased facilities are given to the spring or springs, by which the same can be readily adjusted for a light or heavy load or weight in the vehicle. This invention is also simple in construction, convenient in operation, and not liable to get out of repair; and it consists in providing truss-rods, connected to a spring or springs located at one or either end of the body, said truss-rods supporting the body through the medium of side bars, springs, or connected directly to the body, as may be desired, as will be hereinafter more fully described.

Referring to the annexed drawings, Figure 1 is a bottom view of a device embodying my invention. Fig. 2 is a section on line $x\,x$ of Fig. 1, and Fig. 3 is a detail view of the truss-rod and fastening.

A represents the body of a vehicle; B, the side bars, and C the bolsters, which may be of any known or desired form. To the under side of the body are attached bars $f\,f$, extending out at either side beyond the body, and secured to the projections $e\,e$, which are attached to the side bars or springs, B. On the insides of the bolsters are secured springs $d\,d$, as shown, and the outer ends of said springs are connected by the adjustable truss-rods $a\,a$, said rods supporting the body of the vehicle. These truss-rods $a$ are provided at each end with screw-threads, and the links $b\,b$, with which they are connected, are provided with female screw-threads. Said links are connected to swivels $c$, which are secured to the springs $d$. By this arrangement the links $b$ can be turned so as to make more or less tension upon the springs $d\,d$, as may be desired, and thus adjust the springs for a light or heavy load for the vehicle, at pleasure.

If desired, the side bars or springs, B, may be dispensed with, and the truss-rods attached directly to the body of the vehicle.

Having thus fully described the invention, what is claimed, and desired to be secured by Letters Patent, is—

1. The springs $d$ and truss-rods $a$, in combination with the link $b$ and swivel $c$, for adjusting the tension of the springs, as herein described.

2. The bow-springs $d$, adjustable truss-rods $a$, and body A, in combination with the side bars or springs, B, substantially as herein specified.

In testimony that I claim the foregoing as my own I have hereto affixed my signature in presence of two witnesses.

SIDNEY D. KING.

Witnesses:
J. T. KENNEDY,
H. J. WEAVER.